May 1, 1956 A. M. LIPPISCH 2,743,888
VARIABLE WING
Filed Oct. 20, 1951 2 Sheets-Sheet 2

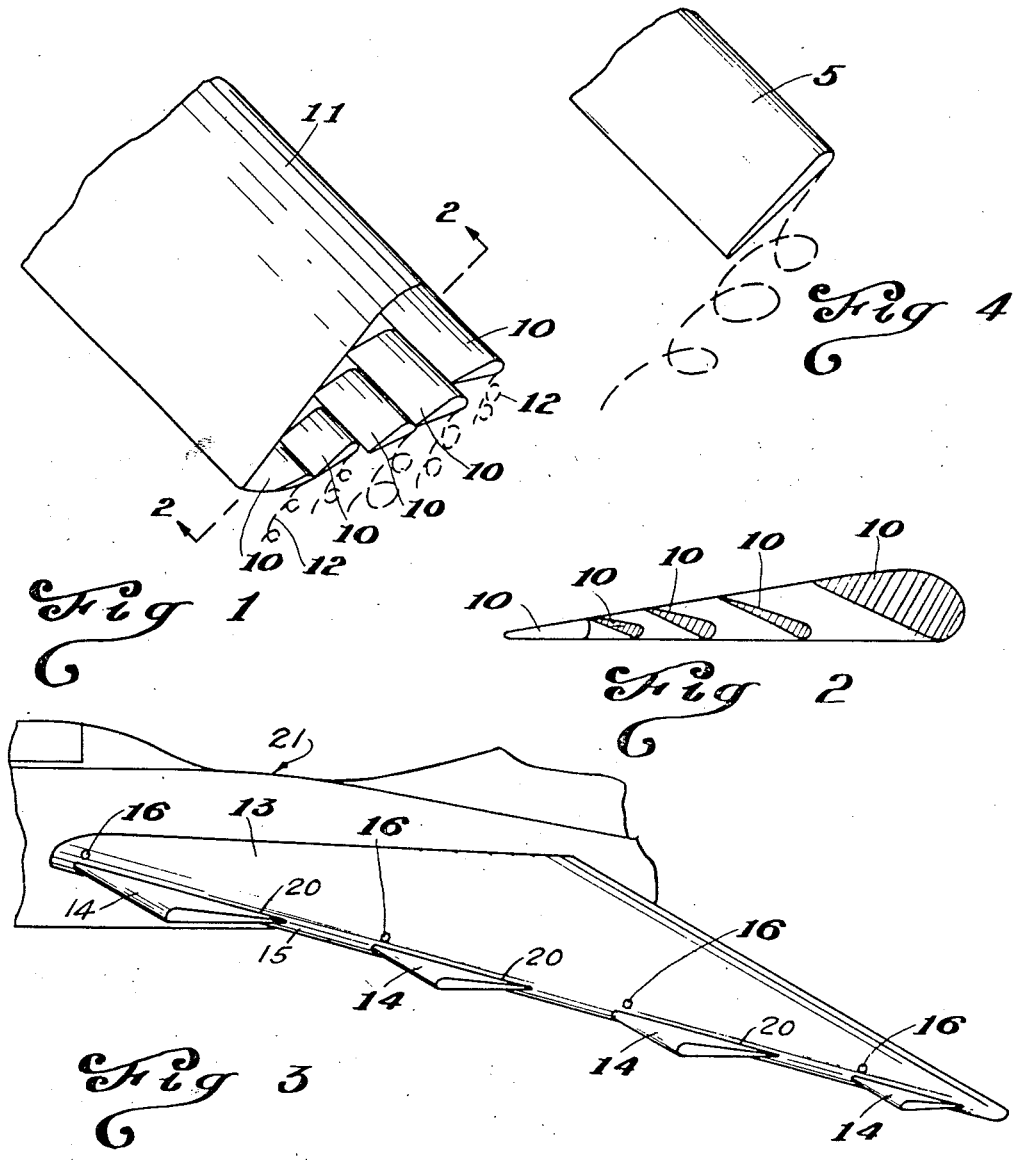

INVENTOR.
ALEXANDER M. LIPPISCH
BY
ATTORNEY

United States Patent Office 2,743,888
Patented May 1, 1956

2,743,888

VARIABLE WING

Alexander M. Lippisch, Cedar Rapids, Iowa, assignor to Collins Radio Company, Cedar Rapids, Iowa, a corporation of Iowa Application October 20, 1951, Serial No. 252,251

4 Claims. (Cl. 244—43)

This invention relates in general to aircraft wings, and in particular to apparatus which decreases losses due to tip vortices.

It is well known that wings which produce lift from motion through the air necessarily develop a certain amount of drag due to such lift. This drag is caused by the flow of air around the wing tip causing tip vortices behind the wings. The rotational energy accumulated in these tip vortices represents a loss and the work necessary to overcome the induced drag is equal to the losses of rotational energy in the wing tip vortices. Induced drag is a function of the span loading, which means a function of the lift per unit length across the span as explained by the expression:

$$D_i = \frac{1}{\pi \frac{\rho}{2} V^2} \left(\frac{L}{b}\right)^2 \quad (1)$$

where $$\frac{\rho}{2} V^2$$

is the stagnation pressure, L is the lift, b is the span and $D_i$ is the induced drag.

It is seen from this expression that the induced drag increases with the square of the span loading, and it is difficult to overcome the induced drag if a large span loading is used at lower flight speeds. A large span loading is necessary for high speed airplanes which are designed for transonic and supersonic flight. At these high speeds the induced drag becomes small due to the large stagnation pressure while the drag due to compressibility effects is a large proportion of the total drag of the airplane. It has been proved that the drag due to compressibility effects decreases by using wings with a small span and larger cord lengths. The so-called low aspect ratio wing is therefore a necessary feature of high speed aircraft.

Difficulties are encountered, however, when it is attempted to fly such aircraft at low speeds, as for example, during takeoffs and landings. Since the induced drag is very large at low speeds it is necessary to use a large amount of power at low speeds. The sinking speed for such an aircraft is also large and this adds to the difficulty in landing them.

It is an object of this invention therefore to provide means for reducing the induced drag of wings with low aspect ratios.

Another object of this invention is to decrease the induced drag of an aircraft wing so that it may be handled more effectively and safely at low speeds.

Further objects and advantages of this invention will become apparent from the following description when read in view of the drawings in which:

Figure 1 is a perspective view of a wing tip utilizing the principles of my invention;

Figure 2 is a sectional view taken on line 2—2 of Figure 1;

Figure 3 is a perspective view of the principles of my invention as applied to a swept back wing;

Figure 4 is a perspective view of a conventional wing tip; and,

Figure 5:
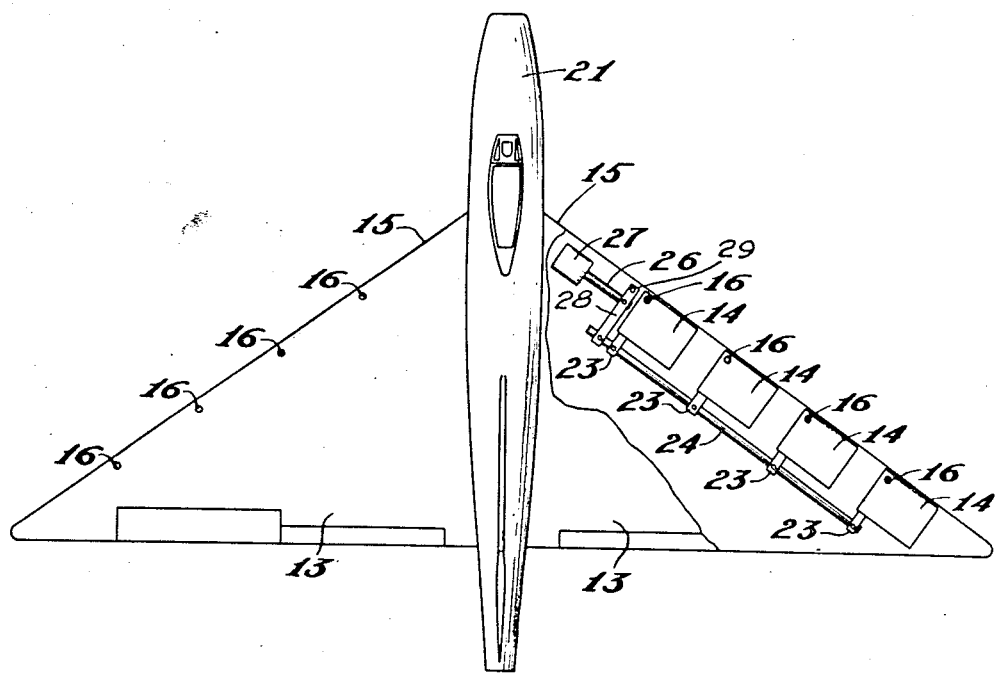
Figure 5 is a cutaway plan view of the apparatus shown in Figure 3.

As illustrated in Figure 4, around the tip of a conventional straight wing 5 there is produced a rotational air flow. This rotational flow combined with the forward motion of the wing through the air generates a spiraling flow which causes the energy imparted to the air in this large tip vortex to be lost. If the wing tip is changed from one large portion to a number of smaller winglets then each winglet will have a separate vortex with the diameters being much smaller than that of the vortex shown in Figure 4. Such a wing is illustrated in Figure 1 wherein a plurality of smaller winglets 10 are formed at the end of a wing 11 and the individual tip vortices 12 are shown trailing from each winglet. The structure of Figure 1 produces at the end of the wing a thin sheet of wing vortices rather than a large spiral vortex as is produced in Figure 4.

The total circulation in the vortex sheet of Figure 1 is equal to the circulation of the single large vortex, but the energy losses are smaller in the vortex sheet because the rotational energy in each vortex is proportional to the square of the circulation. For instance, if the circulation in both wings is equal to 12 and if the wing shown in Figure 4 has four winglets which generate four small vortices of magnitude equal to 3, the losses in the single vortex would be proportional to 12 squared or 144. The losses in the four smaller vortices would be 3 squared times 4 or 36.

The drag force produced by a formation of the vortex can be written as:

$$D_{vortex} = C \rho A^2 \quad (2)$$

where C is a dimensionless constant, $\rho$ is density of the fluids measured in pounds-second squared per foot to the fourth, and A is the circulation measured in feet squared per second.

The formula seems to indicate that it is only necessary to make a single vortex into an infinite number of smaller vortices to avoid any drag due to vortex formation. But this is not true physically because there is a certain minimum size of any single vortex due to the compressibility.

The wing shown in Figure 1 will substantially reduce the induced drag. It is to be noted that the winglets 10, best shown in Figure 2, are mounted at an angle and point downwardly with reference to the main wing section 11. This is so as to intercept some of the rotational energy in the preceding vortices and change it to lift.

The Figure 3 illustrates a swept back wing 13 attached to a fuselage 21 which has mounted in its leading edge 15 a number of winglets 14 which are pivoted by generally vertically extending pins 16 so that they may be moved outwardly into the air stream when desired. The winglets 14 are retractable within slots 20 formed in the leading edge 15. The entire leading edge of a swept back wing, as for example a delta wing, acts like a wing tip. It has been proven experimentally that such a wing will produce a substantial vortex.

To reduce this one large vortex into a number of smaller vortices and reduce the induced drag, the pivoted winglets 14 may be used during landings and takeoffs when high lift coefficients are necessary. The winglets may be pivoted outwardly and thus substantially reduce the induced drag. Once the aircraft is at a high speed, the winglets may be retracted and flown as a delta wing aircraft.

Figure 5 is cutaway plan view illustrating the winglets 14 in a retracted position. It is to be noted that pins 16 pivotally support winglets 14 on the corners adjacent the leading edge of the wing and closest to the fuselage. Levers 23 are connected to each winglet 14 and extend rearwardly from the leading edge 15 of the wing.

A driving link 24 is pivotally attached to each of the levers 23. A coupling link 28 has one end pivotally attached to driving link 24 and the opposite end is pivotally supported adjacent the leading edge of the wing by pin 29. An actuating link 26 is pivotally connected to coupling link 28 intermediate its ends. A hydraulic actuator 27 is connected to the actuating link 26 and is controllable from the pilot's compartment. This mechanism allows the winglet to be projected from or retracted within the wing of the aircraft.

It is to be noted that this invention provides means for safely landing a high speed aircraft by substantially reducing the high induced drag which is associated with such aircraft at low speeds. Thus, the plane may be safely handled at low speeds for takeoffs and landings.

Although this invention has been described with respect to particular embodiments thereof, it is not to be so limited as changes and modifications may be made therein which are within the full intended scope of the invention as defined by the appended claims.

I claim:

1. Means for reducing drag and increasing the lift of a wing comprising a plurality of slots formed in the leading edge of said wing, a plurality of vertical pins mounted in said wing, a plurality of winglets pivotally supported by said vertical pins and with each winglet receivable within one of said slots, said winglets pivotally supported by said pins at the corner of the winglet which is adjacent the leading edge of the wing and also nearest the fuselage and actuating means connected to said winglets to move them from a first retracted position to a projected position.

2. Means for reducing the induced drag and increasing the lift of a delta wing comprising, a plurality of slots formed in the leading edge of said delta wing, said slots formed in a plane parallel to the plane of the wing, a plurality of vertical pins mounted in said wing within said slots, said pins mounted in the slots adjacent the leading edge of the wing and also nearest the fuselage, a plurality of winglets receivable within said slots and pivoted adjacent one corner by said pins, an actuating means connected to said winglets to pivot them from a retractive position within said wing to an extended position outside the confines of said wing.

3. Means for reducing the induced drag and increasing the lift of a delta wing comprising, a plurality of slots formed in the leading edge of said delta wing, said slots formed in a plane parallel to the wing, a plurality of vertical pins mounted in said wing and in said slots, said pins mounted in the slots adjacent the leading edge of the wing and also nearest the fuselage, a plurality of winglets receivable within said slots and pivoted adjacent one corner by said pins, a lever attached to each of said winglets, a driving link pivotably attached to each of said levers, a coupling link pivotably attached to the driving link and its opposite end pivotally supported by the wing, an actuating link with one end attached to the coupling link, and a hydraulic actuator attached to the other end of the actuating link.

4. Means for increasing the lift and reducing the induced drag of delta wing aircraft comprising a plurality of slots formed in the leading edge of said delta wing, a plurality of winglets pivotally supported by said wing and mounted within said slots, said winglets pivotally supported by the corner which is nearest the leading edge of the wing and also nearest the fuselage and an actuating means attached to said winglets for moving them from a first retracted position to an extended position.

References Cited in the file of this patent

UNITED STATES PATENTS

| | | |
|---|---|---|
| 1,027,322 | Cole | May 21, 1912 |
| 1,466,551 | Thurston | Aug. 28, 1923 |
| 1,560,860 | Ries | Nov. 10, 1925 |
| 1,606,117 | Caples | Nov. 9, 1926 |
| 1,754,571 | Podolsky | Apr. 15, 1930 |
| 1,767,966 | Crook | June 24, 1930 |
| 1,817,956 | Wait | Aug. 11, 1931 |
| 2,058,803 | Klemperer et al. | Oct. 27, 1936 |
| 2,494,208 | Schultz | Jan. 10, 1950 |
| 2,053,585 | Loedding | Apr. 11, 1950 |
| 2,562,227 | Zobel | July 31, 1951 |
| 2,576,981 | Vogt | Dec. 4, 1951 |

FOREIGN PATENTS

| | | |
|---|---|---|
| 196,410 | Great Britain | Apr. 26, 1923 |
| 446,094 | Great Britain | Apr. 20, 1936 |

OTHER REFERENCES

NACA Technical Note No. 1284, May 1947.